US012368920B2

(12) United States Patent
Nemalipuri et al.

(10) Patent No.: US 12,368,920 B2
(45) Date of Patent: Jul. 22, 2025

(54) ADVERTISEMENT CACHING FOR TARGETED DELIVERY

(71) Applicant: DISH Network L.L.C., Englewood, CO (US)

(72) Inventors: Chandra Nemalipuri, Englewood, CO (US); Robert Drew Major, Orem, UT (US)

(73) Assignee: DISH Network L.L.C., Englewood, CO (US)

( * ) Notice: Subject to any disclaimer, the term of this patent is extended or adjusted under 35 U.S.C. 154(b) by 17 days.

(21) Appl. No.: 18/488,726

(22) Filed: Oct. 17, 2023

(65) Prior Publication Data

US 2025/0080795 A1    Mar. 6, 2025

Related U.S. Application Data

(60) Provisional application No. 63/579,440, filed on Aug. 29, 2023.

(51) Int. Cl.
*H04N 21/433*    (2011.01)
*H04N 21/2668*   (2011.01)
*H04N 21/81*     (2011.01)

(52) U.S. Cl.
CPC ..... *H04N 21/4331* (2013.01); *H04N 21/2668* (2013.01); *H04N 21/812* (2013.01)

(58) Field of Classification Search
CPC ................................................. H04N 21/4331
See application file for complete search history.

(56) References Cited

U.S. PATENT DOCUMENTS

| 8,516,119 B2 | 8/2013 | Banger et al. |
| 9,661,380 B2 | 5/2017 | Major et al. |
| 9,848,249 B2 | 12/2017 | Freed et al. |
| 10,945,048 B2 | 3/2021 | Major et al. |
| 11,172,269 B2 | 11/2021 | Major |
| 2004/0133909 A1* | 7/2004 | Ma ................. H04N 21/2668 348/E7.071 |
| 2010/0121690 A1* | 5/2010 | Lee ................. G06F 16/9535 705/14.1 |

(Continued)

OTHER PUBLICATIONS

PCT International Search Report for International Application No. PCT/US2024/038231 dated Sep. 30, 2024 (4 pages).

(Continued)

*Primary Examiner* — Michael H Hong
(74) *Attorney, Agent, or Firm* — KW Law, LLP

(57) ABSTRACT

Example systems, devices, and methods can initiate playback of content on a client device. The client device determines an advertisement slot is identifiable in the content with a lead time greater than a lead threshold. A first advertisement can be prefetched in response to a playback time of the advertisement slot approaching in the content. The first advertisement is targeted based on the client device and the content. The client device plays the prefetched first advertisement during playback of the content. The prefetched first advertisement can be stored in response to the client device pausing playback before the advertisement slot, skipping the advertisement slot, or rewinding before the advertisement slot. The first advertisement can be prefetched from a demand-side platform for delivery to a user account associated with the client device.

20 Claims, 3 Drawing Sheets

(56) References Cited

U.S. PATENT DOCUMENTS

| | | |
|---|---|---|
| 2011/0166932 A1* | 7/2011 | Smith .................. H04N 21/812 |
| | | 715/835 |
| 2014/0279026 A1 | 9/2014 | Nath et al. |
| 2015/0358689 A1* | 12/2015 | Wen .................. H04N 21/4331 |
| | | 725/32 |
| 2016/0182923 A1 | 6/2016 | Higgs et al. |
| 2017/0208369 A1 | 7/2017 | Major et al. |
| 2018/0359540 A1 | 12/2018 | Major |
| 2018/0376197 A1 | 12/2018 | Gonzalez |
| 2020/0213673 A1 | 7/2020 | Major et al. |
| 2022/0086532 A1 | 3/2022 | Major |

OTHER PUBLICATIONS

PCT Written Opinion of the International Searching Committee for International Application No. PCT/US2024/038231 dated Sep. 30, 2024 (7 pages).

* cited by examiner

ADVERTISEMENT CACHING FOR TARGETED DELIVERY

CROSS-REFERENCE TO RELATED APPLICATIONS

This application claims priority to U.S. Provisional Application No. 63/579,440 entitled "ADVERTISEMENT CACHING FOR TARGETED DELIVERY" and filed on Aug. 29, 2023, which is hereby incorporated by reference.

TECHNICAL FIELD

The following discussion generally relates to content delivery over broadcast and internet channels. Various embodiments prefetch advertisements for delivery to a particular user viewing a particular program.

BACKGROUND

In the past, television viewing typically occurred at home, with one or more family members gathered in front of a television to watch a broadcast program. Television consumption has evolved from CRT screens coupled with an antenna to various viewing devices and delivery systems. Viewers can watch content using phones, tablets, personal computers, set-top boxes, televisions with integrated processing, or video game systems, for example. Additional functions and features have developed as television receivers, media players, and other media playback devices become increasingly sophisticated. Modern television receivers, for example, are capable of presenting additional data to accompany television broadcast content, or of taking any number of useful actions to enhance the viewer's enjoyment of their television programming.

While it would be desirable to allow the television receiver to take enhanced actions based upon the content of the advertisements or other portions of the live broadcast, this can prove difficult to implement in practice. In particular, it can be difficult for a cable provider, satellite broadcaster, or other content distributor to know in advance when certain targeted advertisements will match a suitable viewing slot. Moreover, it is not always possible to know in advance where the advertisements will be located or what advertisements will run due to the nature of live broadcasting. During a live broadcast of a sporting event, for example, the variable commercial break times and program length make it difficult to predict which content will air and when.

The various computing devices used to watch television today also have varied levels of computing power, with many being capable of delivering targeted advertisements. However, storing numerous copies of advertisements and waiting for a suitable viewing slot can waste storage and processing resources. Some delivery mechanisms are also subject to time constraints, which can make delivery of targeted advertisements difficult. During satellite broadcasts, for example, an available ad slot may not be identified until the segment of content with an available ad slot is being broadcast to a set-top box. Some satellite systems do not insert an ad in the first advertisement slot if there is not enough lead time.

It is therefore desirable to create systems, devices, and methods to reliably and quickly allow a content distributor to identify specific advertisements and deliver advertisements in real time or near-real time. These and other desirable features and characteristics will become apparent from the subsequent detailed description and the appended claims, taken in conjunction with the accompanying drawings and this background section.

SUMMARY

Examples of systems, devices, and methods can initiate playback of content on a client device. The client device determines an advertisement slot is identifiable in the content with a lead time greater than a lead threshold. A first advertisement can be prefetched in response to a playback time of the advertisement slot approaching in the content. The first advertisement is targeted based on the client device and the content. The client device plays the prefetched first advertisement during playback of the content.

In various embodiments, the prefetched first advertisement can be stored in response to the client device pausing playback before the advertisement slot, skipping the advertisement slot, or rewinding before the advertisement slot. The first advertisement can be prefetched from a demand-side platform (DSP) for delivery to a user account associated with the client device. A second advertisement can be prefetched in response to purging the first advertisement. The second advertisement can be targeted to the client device and the content. Various examples can purge the second advertisement in response to playing the first advertisement on the client device, or in response to expiration of a viewing period. The content can comprise linear content broadcast or streamed to the client device. The playback time of the advertisement slot can be identified as approaching in the content in response to a period before the ad slot being less than a prefetch threshold.

An example of a content delivery system can include a processor in communication with a non-transitory storage medium configured to store instructions that, when executed by the processor, cause the content delivery system to perform operations. The operations comprise initiating playback of content on a client device, determining an advertisement slot is identifiable in the content with a lead time greater than a lead threshold, and prefetching a first advertisement in response to a playback time of the advertisement slot approaching in the content. The first advertisement is targeted based on the client device and the content. The content delivery system plays the prefetched first advertisement during playback of the content on the client device.

Various embodiments include a non-transitory computer-readable medium configured to store instructions that, when executed by a processor, cause the processor to perform operations. The operations comprise initiating playback of content on a client device, determining an advertisement slot is identifiable in the content with a lead time greater than a lead threshold, and prefetching a first advertisement in response to a playback time of the advertisement slot approaching in the content. The first advertisement is targeted based on the client device and the content. The content delivery system plays the prefetched first advertisement during playback of the content on the client device.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the illustrations.

DETAILED DESCRIPTION

The following detailed description is intended to provide several examples that will illustrate the broader concepts that are set forth herein, but it is not intended to limit the invention, application, or uses of the invention. Furthermore, there is no intention to be bound by any theory presented in the preceding background or the following detailed description.

Systems, methods, and devices disclosed herein can deliver targeted advertisements quickly and efficiently over advertisement-supported content delivery mediums. The advertisements can be selected from a demand-side platform (DSP) or other marketplace for advertisements directed to a targeted audience. For example, the advertisements can be targeted to a user demographic for delivery during a particular program or on a particular channel. The advertisement from the DSP is identified while a user is viewing the particular program or channel, and fetched before the ad should be aired.

Pre-fetched advertisements can be stored locally on a set-top box (STB) or other playback devices where linear television is being delivered over traditional channels. Pre-fetched advertisements can be cached by the content delivery network (CDN) where content is delivered over the internet to a playback device. Some examples can fetch an advertisement a predetermined period before the available advertisement slot is expected. For example, an advertisement can be prefetched in response to a playback time of the advertisement slot approaching during content playback. Once an advertisement is fetched, it can be cached for a predetermined duration if delivery does not occur at the expected time due to a user skipping, seeking, pausing, turning off the playback device, or otherwise taking an action that prevents delivery of the prefetched advertisement. The prefetched advertisement can later be delivered to the target user during resumed playback by the same user.

Various embodiments described below tend to reduce consumption of computing resources by retrieving advertisements identified using the DSP in real time or near-real time. Performance indicators for the success rate of ad delivery tend to be improved, as advertisements that are not shown when expected can be cached and delivered at a later time using the same targeting data as the DSP.

Figure 1:
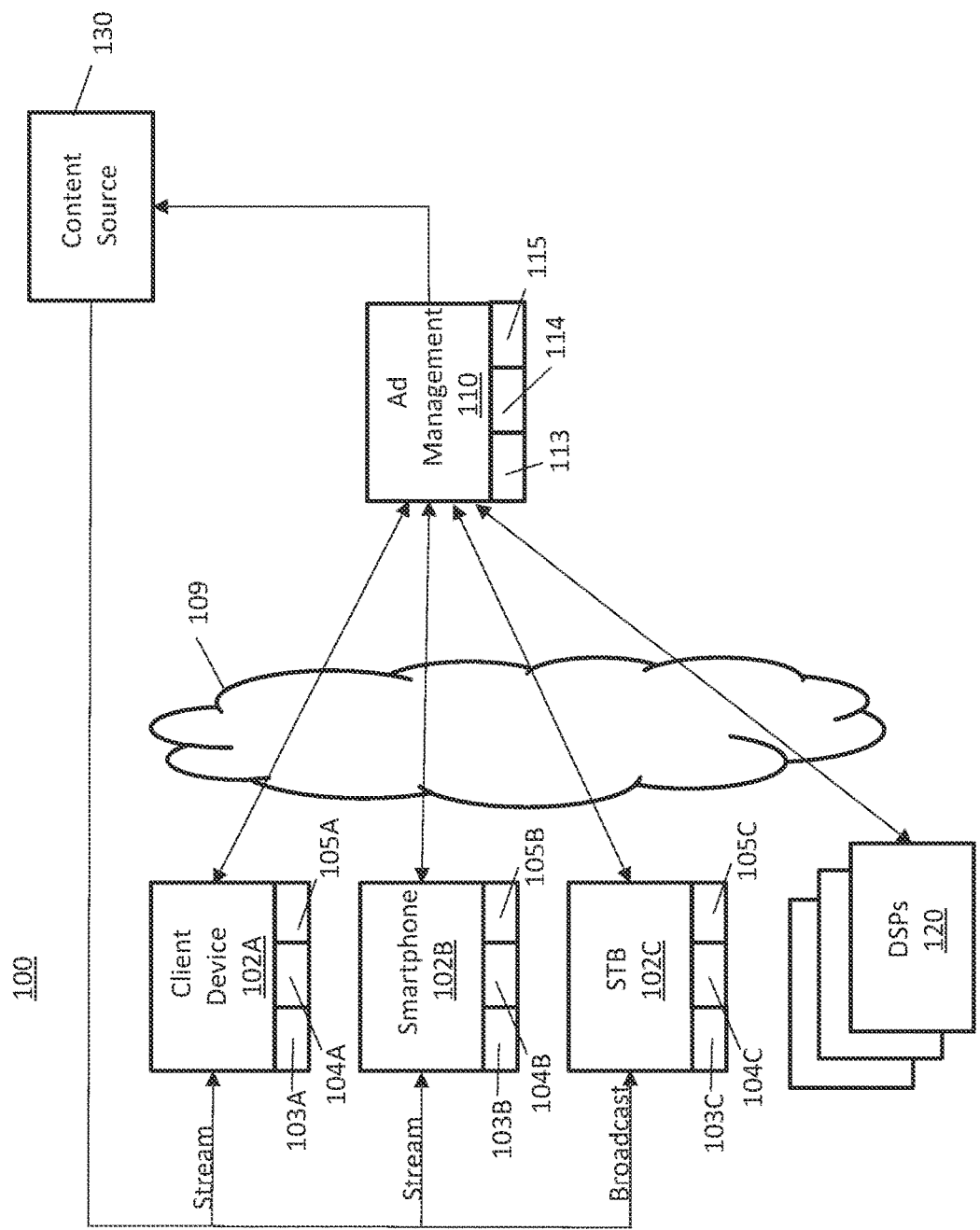
FIG. 1 illustrates an example of a system for selecting and prefetching an advertisement.

With reference to FIG. 1, an example system 100 is shown for delivering advertisements according to various embodiments. System 100 includes a client device 102 in communication with an ad management server 110 over network 109. Network 109 may include a wide area network (WAN) such as the Internet, a telephony network, a public or private network of any sort, a cellular network, or the like. Network 109 can be based upon TCP/IP protocols, or any other protocols as desired, including any protocols subsequently developed. Equivalent embodiments may integrate device location of client device 102 or streaming via local area networks.

Client devices 102A-102C can comprise any device capable of communicating on network 109 to send signatures or metadata to ad management server 110. Smartphone 102B and set-top box 102C are examples of client devices 102A depicted in the example of FIG. 1, though other examples of client devices 102 can include mobile phones, tablets, computers, televisions, smart speakers, receivers, soundbars, or similar devices communicating on network 109. Client devices 102A-102C include hardware such as, for example, processor 103A-103C, memory 104A-104C, input/output interfaces 105A-105C, permanent storage, bios, and the like. Client devices 102A-102C typically run an operating system and applications capable of receiving a signal and outputting video.

In some implementations, client device 102 is a home-type server such as a local storage digital video recorder (LSDVR), placeshifting device, remote storage digital video recorder (RSDVR), or other media server device. One example of client device 102 suitable for use in some implementations could be the AirTV Classic device that is available from http://www.airtv.net, although equivalent embodiments could be used with any number of other DVRs, media receivers/players, video on demand (VOD) servers, set-top boxes, video game consoles, time or place shifting devices, computers, tablets, smartphones, or the like.

Client device 102 transmits viewing data associated with a user account to ad management server 110. Ad management server 110 can be one or more network devices having conventional hardware such as a processor 113, memory 114, and input/output interfaces 115 (e.g., a network interface), and an operating system running applications having various processing routes and modules. Ad management server 110 can include a processor in communication with non-transitory data storage and an interface to network 109. The non-transitory data storage or memory can be configured to store computer-executable instructions that, when executed by the processor, cause ad management server 110 to perform operations. Ad management server 110 may be a standalone server, virtualized server, distributed computing cluster, container, networked computing device, or other computing resources capable of communicating with client device 102 over network 109. Multiple instances of ad management server 110 may be spun up and running in virtualized or distributed environments in response to high computing loads. Ad management servers 110 run multiple applications that are ancillary to ad management as described herein. The various instances of server applications can each be in communication with client devices 102 to receive viewing data or tokens.

Viewing data sent by client devices 102 to ad management servers 110 can include the current program, stream, or channel being viewed. The duration that client device 102 has been tuned into the program, stream, or channel is determined using data indicating whether the user device is playing back content at normal speeds, skipping, rewinding, or pausing. Viewing data can indicate whether an advertisement was viewed by a target user or user account at normal speeds (e.g., 1x). Viewing data can be timestamped or can include viewing durations. Ad management servers 110 can use viewing data to determine whether a device associated with a user account has viewed a contracted advertisement under conditions suitable to the DSP 120 originating the advertisement.

DSPs 120 can communicate with ad management servers 110 across network 109 (e.g., the Internet). DSPs 120 match advertisements to available advertisement slots in content delivered by content source 130. Other platforms can be used in place of DSPs 120 to match advertisements with available ad slots based on criteria that ad management servers 110 can detect on client devices 102.

Client devices 102 receive media from content source 130 or other media sources. For example, a suitable media source may be a local storage device formatted to include a database of media content, a file server, a cloud storage system, a content delivery network (CDN), a television broadcaster, a video game device, a social media platform, an online video repository, a time or placeshifting device, or the like. For example, content source can be satellite broadcast content delivered to STB 102C. Satellite broadcast content can be similar to the content commercially available under the DISH tradename and can be played immediately or time shifted using video recording systems such as, for example, a digital video recorder (DVR). STB 102C can identify the associated user account, the program being viewed, the channel being viewed, and the duration STB 102C has been tuned to and rendering the program or channel. In another example, content source 130 can stream over the Internet to smartphone 102B. Content source 130 in the streaming example can deliver content similar to the content commercially available under the SLING tradename.

Content source delivers ad-supported content that includes advertisement slots available for content source 130 to fill. In some embodiments, content source 130 receives advertisements from DSP 120 and writes the advertisements directly into a content stream. Client devices 102 can also receive advertisements from ad management server 110 or DSP 120 to insert into a television broadcast or a content stream in a designated advertisement slot.

The media content delivered to client devices 102 is selectable by input on client device 102. Suitable content includes time or place shifted video, video on demand, over-the-air broadcasts, satellite broadcasts, video streams, or other media content for selection and display on client devices 102. Client devices 102 can also tune to broadcast channels to view scheduled programming in some embodiments.

Client devices 102 may also transmit metadata to ad management server 110 related to the content or advertisements consumed on client devices 102. Metadata can include a source channel, source IP address, source port, source name, timestamp, geolocation, internet service provider, device identifier, user account, program identifier, channel identifier, advertisement identifier, user demographics, or other metadata suitable for identifying the source, location, and time the content was replayed or recorded. Metadata can be used by ad management server 110 or DSP 120 to confirm the targeting requirements of an advertisement contracted by a DSP 120 were met during delivery of the advertisement.

In some embodiments, ad management server 110 is in communication with content source 130 to prepare content including targeted advertisements for consumption by end users. Content source 130 can deliver content on the Internet or another network 109 as part of an RSDVR. VOD, or other media streaming service. A media player application executing on one or more client devices 102 may include logic to select content as needed to obtain and playback the media programs streams, broadcasts, or other media delivery channels. Content may be readily routable on network 109 and may be served by conventional CDN or other web-type servers, thereby providing a convenient mechanism for distributing media streams to a variety of different client devices 102 on network 109.

Figure 2:
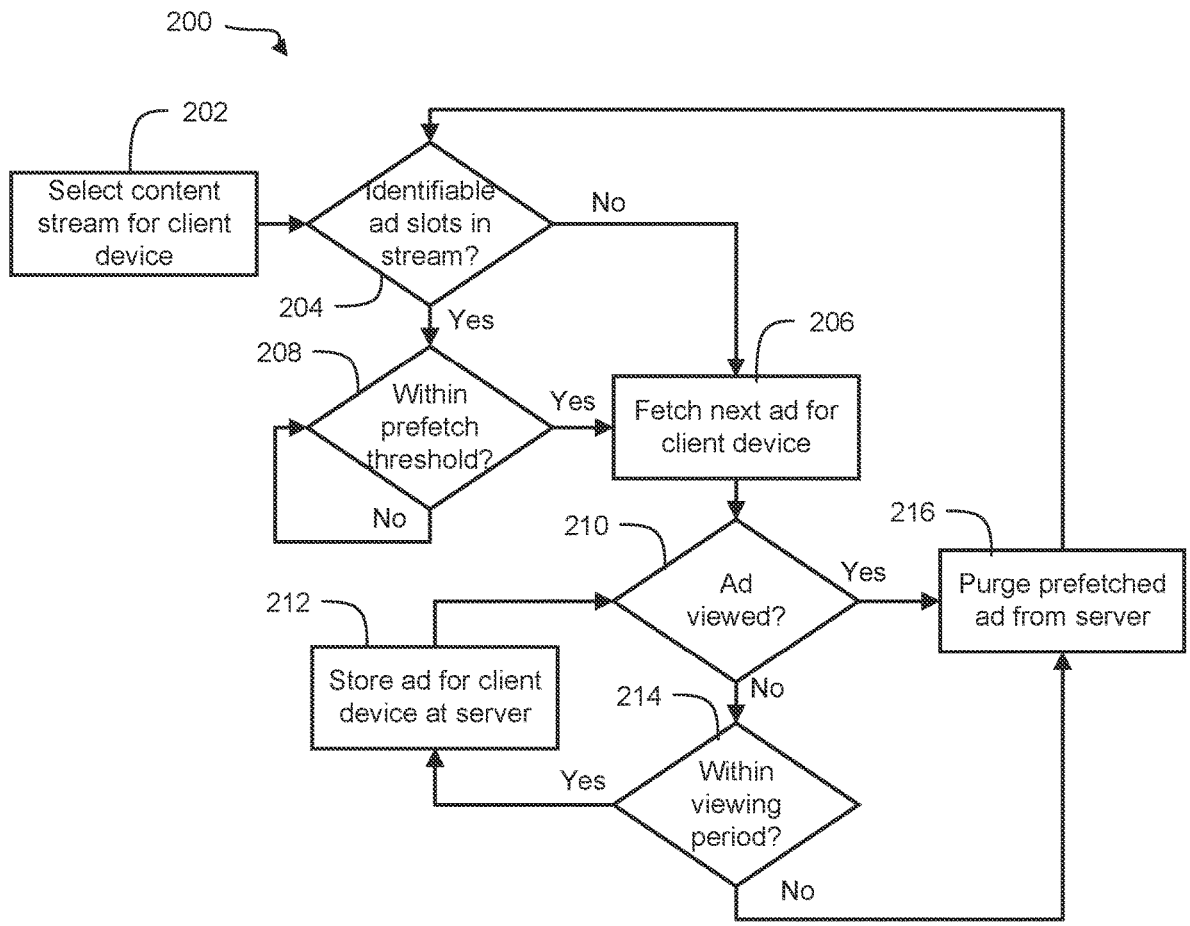
FIG. 2 illustrates an example of a process for prefetching advertisements for delivery in a content stream.

Referring now to FIG. 2, an example process 200 is shown for delivering targeted advertisements from DSP 120 to client devices 102 of system 100. In the example of FIG. 2, content source 130 from system 100 can be a streaming service that delivers content over network 109 (e.g., the Internet). Process 200 includes the step of selecting a content stream for the client device (Block 202). The content stream can be selected at content source 130 in response to a request from client device 102. The selected content stream can be transmitted from content source 130 to client device 102 in segments using adaptive bit rates. The content stream can be selected in response to client device 102 tuning into the content stream for a predetermined duration. The predetermined duration can be 1 minute, 5 minutes, 10 minutes, or any other duration suitable for indicating that the user is tuned into and viewing the content stream rather than searching through content to identify a content stream. System 100 may determine that a content stream has been selected based on past behavior of client device 102.

In some embodiments, content source 130 can determine whether the content stream contains ad slots that are identifiable in advance of being viewed (Block 204). Ad slots can be identifiable in advance if content source 130 can detect the ad source with sufficient lead time to retrieve a replacement ad and insert the replacement ad into the ad slot before transmitting the ad slot. In some examples, ad slot locations can be known at the time the stream is initiated. Ad slots can be detectable in advance in response to having a lead time greater than a lead threshold duration. Ad slots can further be known when an ad marker (e.g., an SCTE 35 marker) is detected in the streamed content. Various examples can include an ad manifest such as, for example, a 30-second ad manifest with two 15-second ad slots. Ad slots may be identified a predetermined duration in advance.

If ad slots are not identifiable in advance of being streamed, then content source 130 can retrieve an ad for client device 102 from ad management server 110 (Block 206). In some embodiments, client device 102 can fetch the replacement advertisement directly from ad management server 110. Ad management server 110 may identify and retrieve a suitable advertisement using DSP 120. Ad management server 110 may also be an edge server or other edge resource in communication with client devices. The advertisement fetched from DSP 120 can include parameters that the advertiser is bidding on. For example, the ad can be targeted based on any combination of demographic data, content data, channel data, time data, or other metadata describing the content stream. For example, the retrieved advertisement can be targeted to a particular user (e.g., a client device associated with a user account) while tuned into particular content (e.g., a program or channel). Ad management server 110 can store the fetched advertisement locally or send the fetched advertisement to content source 130 or client device 102 for storage until insertion into the content stream to the targeted user or client device 102. In response to ad slots being identifiable in the stream with sufficient notice for replacement, content source 130, ad management server 110, or client device 102 may wait until a predetermined duration before the expected location of the ad slot in the stream (Block 208) before fetching the next ad for the client device or user (Block 206).

In various embodiments, content source 130, ad management server 110, or client device 102 can monitor playback characteristics to determine whether a user has viewed all or part of the advertisement (Block 210). Content source 130, ad management server 110, or client device 102 can determine a user has not viewed an advertisement in response to client device 102 skipping over the ad slot during playback, client device 102 pausing playback before rendering the ad slot, client device 102 powering down before rendering the ad slot, client device 102 tuning into a different content stream before the ad slot, or client device 102 otherwise not having rendered all or part of the prefetched advertisement. The ad may be deemed unviewed in response to client device 102 failing to render the advertisement in the ad slot in accordance with the parameters of DSP 120. In some embodiments, a client device 102 may send a token to ad management server 110 or content source 130 to indicate successful playback of an advertisement.

If the ad has not been viewed, system 100 may check whether the prefetched ad is within a predetermined retention period or viewing period (Block 214). System 100 may retain prefetched advertisements for a retention period or viewing period ranging from 30 minutes to 1 day. For example, system 100 may retain advertisements for 1 hour, 2 hours, 3 hours, 4 hours, 5 hours, or 6 hours. Content source 130, ad management server 110, or client device 102 can store the prefetched advertisement in response to being within the viewing period (Block 212). If the prefetched advertisement is outside of the viewing period (e.g., the viewing period has expired), system 100 may purge the prefetched ad from storage (Block 216).

In response to system 100 determining the prefetched ad has been viewed (i.e., in Block 210), system 100 may purge the ad (Block 216) or check whether future ad slots are identifiable in the ad stream (Block 204). For example, if the content stream is in the first 30 second ad slot of a one-minute window, then the second ad slot can be identified with sufficient lead time to fetch a new ad and insert the fetched ad into the second ad slot of the one-minute window. In an example where no future ad slots are identifiable, content source 130 or ad management server 110 can prefetch another advertisement based on the client device and the content stream.

Figure 3:
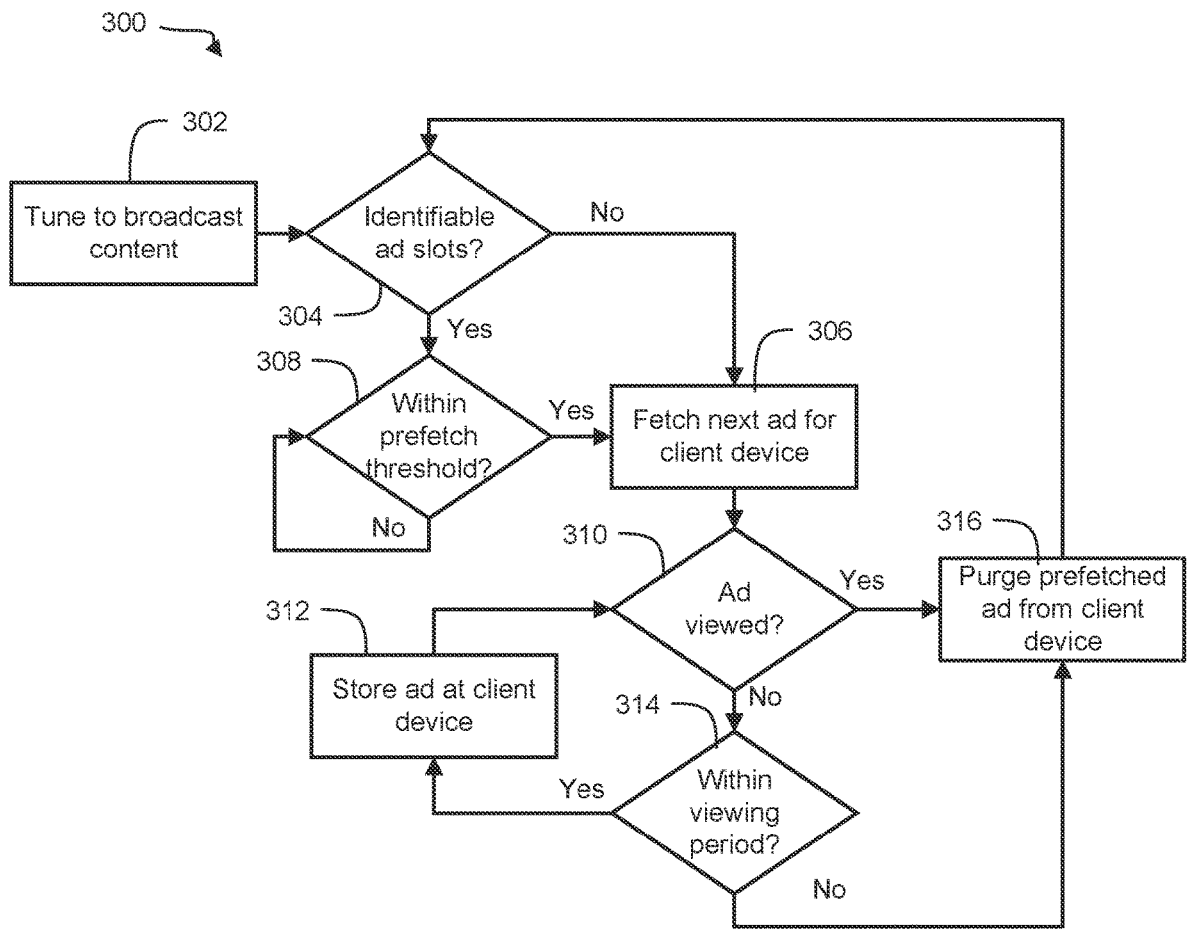
FIG. 3 illustrates an example of a process for prefetching advertisements on a set-top box for delivery in broadcast content.

With reference to FIG. 3, example process 300 is shown for prefetching advertisements, in accordance with various embodiments. In some embodiments, process 300 can be used to insert advertisements into broadcast or linear content. In the example of FIG. 3, content source 130 can be a broadcast service that delivers linear content over the air. Process 300 includes the step of selecting a content stream for the client device (Block 302). The content stream can be selected at client device 102 by tuning into a broadcast channel. The selected content stream can be transmitted from content source 130 to client device 102 using satellite broadcast techniques. The content stream can be selected in response to client device 102 tuning into the content stream for a predetermined duration. The predetermined duration can be 1 minute, 5 minutes, 10 minutes, or any other duration suitable for indicating the user is tuned into and viewing the content stream. System 100 may determine that a content stream has been selected based on past behavior of client device 102. A content stream may not be identified as selected if client device 102 is searching through channels.

In some embodiments, content source 130 or client device 102 can determine whether the content stream contains ad slots that are identifiable in advance (Block 304). Ad slots can be identifiable in advance if content source 130 can identify the ad source with a sufficient lead time to retrieve a replacement ad and insert the replacement ad into the ad slot before transmitting the ad slot. In some examples of linear content delivery, ad slot locations can be known at the time the broadcast is initiated by content source 130. Ad slots can be detectable in advance in response to having a lead time greater than a predetermined duration. A suitable predetermined duration might be 3 seconds, 4 seconds, 5 seconds, 6 seconds, or any other duration sufficient for ad management server 110 to fetch and advertisement from DSP 120, for ad management server 110 to transmit the advertisement to client device 102, and for client device 102 to insert the prefetched advertisement into the ad slot. Ad slots can further be identifiable when an ad marker (e.g., an SCTE 35 marker) is detected in the broadcast content with sufficient lead time for ad replacement.

If ad slots are not identifiable in advance of broadcasting them, then ad management server 110 can prefetch an ad for client device 102 (Block 306). Ad management server 110 may identify and retrieve a suitable advertisement using DSP 120. The advertisement fetched from DSP 120 can include parameters that the advertiser is bidding on. For example, the ad can be targeted based on combinations of demographic data, content data, channel data, time data, or other metadata describing the content stream. For example, the retrieved advertisement can be targeted to a particular user while tuned into particular content (e.g., a show or channel). Client device 102 can store the fetched advertisement locally after receiving it from ad management server 110 for storage until insertion into the broadcast content. In response to ad slots being identifiable in the stream with sufficient notice for replacement, ad management server 110 may wait until a predetermined duration before the expected location of the ad slot in the stream (Block 308) before fetching the next ad for client device 102 (Block 306).

In various embodiments, client device 102 can monitor playback characteristics to determine whether a user has viewed all or part of the advertisement (Block 310). Client device 102 can determine that a user has not viewed an advertisement in response to client device 102 skipping over the ad slot during playback, client device 102 pausing playback before rendering the ad slot, client device 102C powering down before rendering the ad slot, client device 102 tuning into a different content stream before the ad slot, or client device 102 otherwise not having rendered all or part of the prefetched advertisement. The ad may be deemed unviewed in response to client device 102 failing to render the advertisement in the ad slot in accordance with the parameters of DSP 120. Client device 102 can communicate data over network 109 indicating whether the advertisement has been viewed. The data indicating whether content has been viewed can be processed on ad management server 110 or content source 130.

If the ad has not been viewed, client device 102 may check whether the prefetched ad is within a predetermined retention period or viewing period (Block 314). Client device 102 may retain prefetched advertisements for a retention period or viewing period ranging from 30 minutes to 1 day (for example, system for 1 hour, 2 hours, 3 hours, 4 hours, 5 hours, or 6 hours). Client device 102 can store the prefetched advertisement in response to being within the viewing period (Block 312). If the prefetched advertisement is outside of the viewing period, client device 102 can purge the prefetched ad from storage (Block 316).

In response to client device 102 determining the prefetched ad has been viewed (i.e., in Block 310), system 100 may check whether future ad slots are identifiable in the ad stream. For example, if the content stream is entering the first 30-second ad slot of a one-minute window, the second ad slot can be identified with sufficient lead time to fetch a new ad and insert into the second ad slot of the one-minute window. In an example where no future ad slots are identifiable, content source 130 or ad management server 110 can immediately fetch another advertisement based on the client device and the content stream.

Systems, methods, and devices of the present disclosure tend to improve advertisement delivery. Advertisements are prefetched with enough lead time to replace a leading ad in linear programming. Satellite television providers, for example, can prefetch an advertisement and replace an advertisement within a few seconds of broadcast delay. Replaceable advertisements in live broadcasts can be identified and replaced by prefetching advertisements using techniques described above. Storage and computing resources can be conserved, and ad delivery metrics improved, by retaining prefetched advertisements for a viewing period or until the ad is viewed by a user fitting the ad criteria. Advertisements can also be prefetched just-in-time using the above techniques when advertisement clots are identifiable in advance.

Benefits, other advantages, and solutions to problems have been described herein with regard to specific embodiments. Furthermore, the connecting lines shown in the various figures contained herein are intended to represent examples of functional relationships or couplings between the various elements. It should be noted that many alternative or additional functional relationships or connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "A, B, or C" is used herein, it is intended that the phrase be interpreted to mean that A alone may be present in an embodiment, B alone may be present in an embodiment, C alone may be present in an embodiment, or that any combination of the elements A, B, and C may be present in a single embodiment (for example, A and B, A and C, B and C, or A and B and C).

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises." "comprising." or any other variation thereof, are intended to cover a non-exclusive inclusion, such that a process, method, article, or device that comprises a list of elements does not include only those elements but may include other elements not expressly listed or inherent to such process, method, article, or device.

The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process, comprising:
   initiating, by a client device, playback of content;
   determining, by the client device, an advertisement slot is identifiable in the content with a lead time greater than a lead threshold;
   determining the client device has been tuned to the content for a predetermined viewing duration;
   fetching, into a cache of an edge server, a first advertisement in response to a playback time of the advertisement slot approaching and in response to the client device being tuned to the content for the predetermined viewing duration, wherein the first advertisement is targeted based on the client device and the content;
   retaining, in the cache of the edge server, the first advertisement in response to the client device interrupting the playback of the content before reaching the advertisement slot;
   transmitting, by the edge server, the first advertisement to the client device in response to the client device resuming the playback of the content; and
   playing, by the client device, the first advertisement during the playback of the content.

2. The automated process of claim 1, further comprising storing the first advertisement in response to the client device pausing the playback before the advertisement slot, skipping the advertisement slot, or rewinding before the advertisement slot.

3. The automated process of claim 1, wherein the first advertisement is fetched from a demand-side platform (DSP) for delivery to a user account associated with the client device.

4. The automated process of claim 1, further comprising prefetching a second advertisement in response to purging the first advertisement from the cache, wherein the second advertisement is targeted to the client device and the content.

5. The automated process of claim 1, wherein the content comprises linear content broadcast to the client device.

6. The automated process of claim 1, further comprising identifying the playback time of the advertisement slot as approaching in the content in response to a period before the ad slot being less than a prefetch threshold.

7. The automated process of claim 4, further comprising purging the second advertisement from the cache in response to playing the first advertisement on the client device.

8. The automated process of claim 4, further comprising purging the second advertisement from the cache in response to expiration of a viewing period.

9. A content delivery system comprising a processor in communication with a non-transitory storage medium configured to store instructions that, when executed by the processor, cause the content delivery system to perform operations, the operations comprising:
   initiating playback of content on a client device;
   determining an advertisement slot is identifiable in the content with a lead time greater than a lead threshold;
   determining the playback of the content at the client device has exceeded a predetermined viewing duration;
   prefetching a first advertisement in response to a playback time of the advertisement slot approaching and in response to the playback of the content exceeding the predetermined viewing duration, wherein the first advertisement is targeted based on the client device and the content; and
   playing, by the client device, the prefetched first advertisement during the playback of the content.

10. The content delivery system of claim 9, wherein the operations further comprise storing the prefetched first advertisement in response to the client device pausing the playback before the advertisement slot, skipping the advertisement slot, or rewinding before the advertisement slot.

11. The content delivery system of claim 9, wherein the first advertisement is prefetched from a demand-side platform (DSP) for delivery to a user account associated with the client device.

12. The content delivery system of claim 9, wherein the operations further comprise prefetching a second advertisement in response to purging the first advertisement, wherein the second advertisement is targeted based on the client device and the content.

13. The content delivery system of claim 9, wherein the content comprises linear content broadcast to the client device.

14. The content delivery system of claim 9, wherein the content comprises linear content streamed to the client device.

15. The content delivery system of claim 12, wherein the operations further comprise purging the second advertisement in response to playing the first advertisement on the client device.

16. The content delivery system of claim 12, wherein the operations further comprise purging the second advertisement in response to expiration of a viewing period.

17. A non-transitory computer-readable medium configured to store instructions that, when executed by a processor, cause the processor to perform operations, the operations comprising:
  initiating playback of content on a client device;
  determining an advertisement slot is identifiable in the content with a lead time greater than a lead threshold;
  fetching, into a cache of an edge server, a first advertisement in response to a playback time of the advertisement slot approaching in the content, wherein the first advertisement is targeted based on the client device and the content;
  retaining the first advertisement in the cache of the edge server in response to the client device interrupting the playback of the content before delivery of the first advertisement;
  transmitting the first advertisement to the client device in response to the client device resuming the playback of the content; and
  playing, by the client device, the first advertisement during the resumed playback of the content.

18. The non-transitory computer-readable medium of claim 17, wherein the operations further comprise storing the first advertisement in response to the client device pausing the playback before the advertisement slot, skipping the advertisement slot, or rewinding before the advertisement slot.

19. The non-transitory computer-readable medium of claim 17, wherein the first advertisement is fetched from a demand-side platform (DSP) for delivery to a user account associated with the client device.

20. The non-transitory computer-readable medium of claim 17, wherein the operations further comprise:
  prefetching a second advertisement in response to purging the first advertisement, wherein the second advertisement is targeted based on the client device and the content; and
  purging the second advertisement in response to expiration of a viewing period.

* * * * *